United States Patent [19]

Erb

[11] 3,989,927
[45] Nov. 2, 1976

[54] ELECTRIC HEATER UTILIZING A POURABLE HEAT STORAGE BULK

[76] Inventor: Georg Otto Erb, D-5241 Bindweide, Westerwald, Germany

[22] Filed: Aug. 6, 1973

[21] Appl. No.: 385,691

[30] Foreign Application Priority Data
Aug. 5, 1972  Germany............................ 2238612
Aug. 5, 1972  Germany............................ 2238611

[52] U.S. Cl. ............................... 219/378; 126/400; 165/10; 219/365; 219/530
[51] Int. Cl.² ........................ H05B 1/00; F24H 7/02
[58] Field of Search ........... 219/365, 378, 341, 326, 219/530, 540, 302; 126/400; 165/10, 104

[56] References Cited
UNITED STATES PATENTS

| | | | |
|---|---|---|---|
| 2,671,644 | 3/1954 | Zenner et al. ........................ | 165/10 |
| 2,776,562 | 1/1957 | Davie et al. .................. | 219/365 UX |
| 2,858,781 | 11/1958 | Hexdall ........................ | 126/400 UX |
| 2,911,513 | 11/1959 | MacCracken................... | 219/378 X |
| 3,062,510 | 11/1962 | Percival ...................... | 219/325 UX |
| 3,381,113 | 4/1968 | Jacques et al. ..................... | 219/378 |
| 3,624,356 | 11/1971 | Havill................................. | 219/530 |

FOREIGN PATENTS OR APPLICATIONS

| | | | |
|---|---|---|---|
| 405,319 | 10/1924 | Germany ........................... | 219/365 |
| 309,640 | 3/1969 | Sweden............................... | 219/378 |
| 76,291 | 12/1917 | Switzerland......................... | 219/341 |
| 1,172,684 | 12/1969 | United Kingdom.................. | 219/378 |
| 480,560 | 2/1938 | United Kingdom.................. | 219/530 |
| 881,469 | 11/1961 | United Kingdom.................. | 219/341 |
| 1,135,855 | 12/1968 | United Kingdom.................. | 219/378 |
| 1,262,465 | 2/1972 | United Kingdom.................. | 219/378 |
| 977,568 | 12/1964 | United Kingdom.................. | 219/365 |

Primary Examiner—A. Bartis

[57] ABSTRACT

A storage heater for heating a gaseous heat extraction medium is formed of a container of heat resistant material, preferably metal. At least one guide duct, in the form of a tube for carrying the gaseous heat extraction medium, extends through the container which holds a heat storage medium in the form of a pourable bulk of particulate solid material. The thermal storage medium comprises a bulk in which the product of specific heat of the solid material and the bulk density of the mass is at least 0.7 kcal/° C dm³, the specific heat of the solids material being at least 0.12 kcal/° C kgf and the bulk density of the solids material being at least 2.5 kgf/dm³. The thermal storage medium is a material which can be in direct contact with the air to be heated for places of human habitation.

27 Claims, 2 Drawing Figures

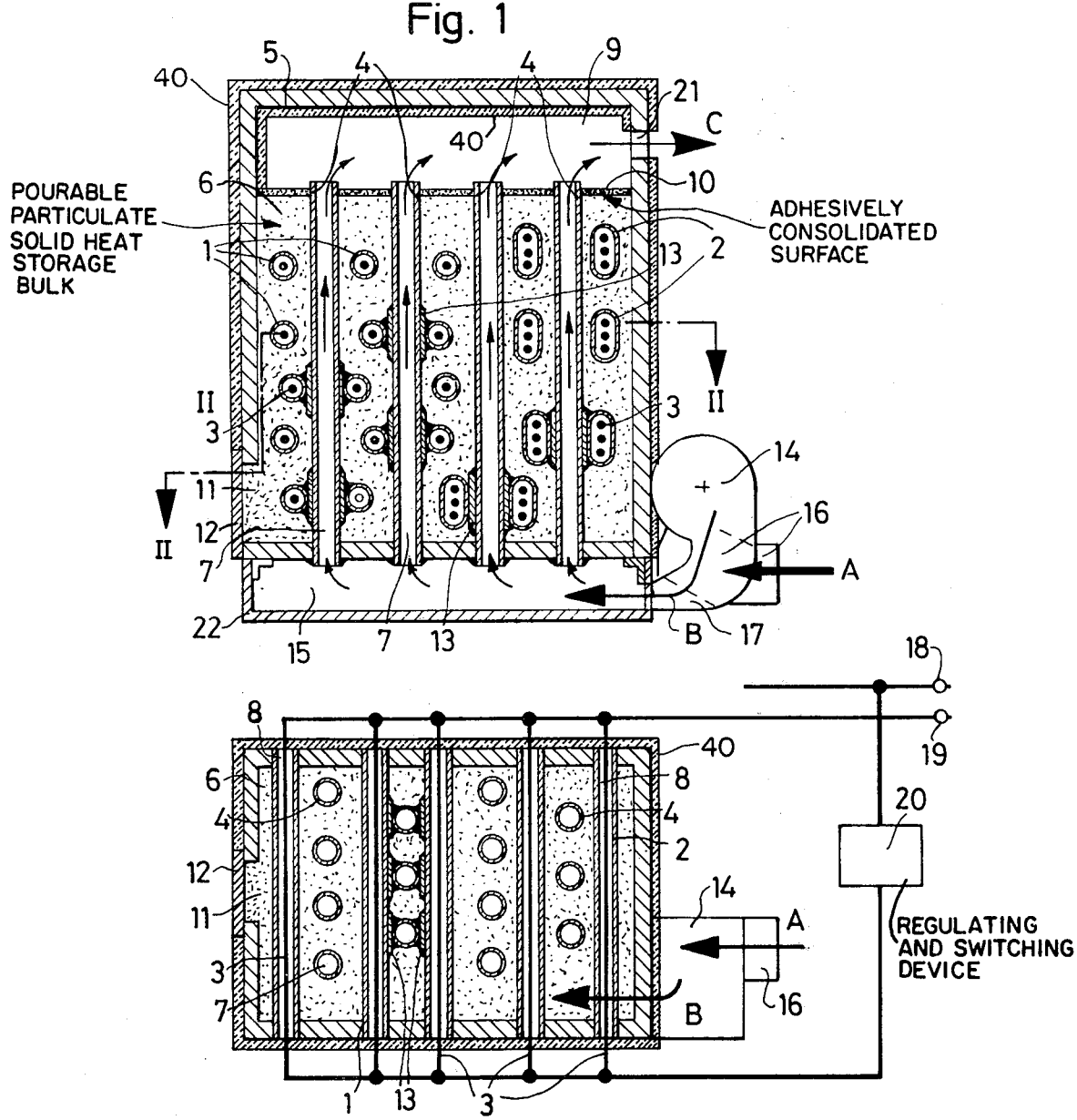

ELECTRIC HEATER UTILIZING A POURABLE HEAT STORAGE BULK

The invention relates to a storage heater for a gaseous heat extraction medium with a container of heat resistant material, preferably metal, through which at least one guide duct, in the form of a tube, extends for the said gaseous heat extraction medium, the container containing a heat storage medium in the form of a pourable bulk of solids material.

It is the object of the invention to provide a storage heater of the kind described hereinbefore but avoiding the disadvantages of known constructions for storage heaters, the storage heater according to the invention permitting not only savings of installation costs and time while offering the best possible utilization of even the smallest space for accommodating the largest possible thermal storage capacity accompanied by simultaneous saving of substantial operating costs and permitting any constructive design of the entire apparatus but in which the thermal efficiency is also increased and simplifications are obtained with regard to its maintenance and repair.

It has been surprisingly discovered that all these requirements can be satisfied with the lowest and most economical effort by a storage heater for a gaseous heat extraction medium with a container of heat resistant material, preferably metal, through which at least one guide duct, in the form of a tube, extends for the said gaseous heat extraction medium, the container containing a heat storage medium in the form of a pourable bulk of solids material in which according to the invention the thermal storage medium comprises a bulk in which the product of specific heat and bulk density of the solids material is at least 0.7 kcal/°C dm$^3$, the specific heat of the solids material being at least 0.12 kcal/°C kgf or the bulk density of the solids material amounting to at least 2.5 kgf/dm$^3$.

It will be evident that the invention enables the entire available container volume to be utilized for thermal storage while the choice of material according to the invention ensures that thermal conduction in the thermal storage material is substantially improved into its farthest corners so that heating-up times and thermal discharge times can be substantially reduced.

According to a further suitable embodiment of the invention the thermal storage medium may advantageously comprise iron granulate in bulk form. Substantial cost reductions can be surprisingly achieved if the thermal storage medium takes the form of a bulk, part of which comprises minerals that contain heavy metals, and the said bulk may advantageously contain ground overburden rock obtained in ore mining. To this end hematite minerals have been found particularly advantageous as thermal storage medium.

A storage heater according to the invention is also prefectly suitable to function as thermal energy source for warm water heating systems, the gaseous heat extraction medium instead of blowing into a room which is to be heated being supplied via a suitably constructed forced circulation duct with assisted circulation in the form of one or more fans, to be supplied to a downstream disposed heat exchanger from which the said heat extraction medium is returned to the entry of the guide ducts which extend through the thermal storage medium. In a construction of this kind it is possible for the feed and return of the heat delivery system which operates with liquid thermal transfer medium, for example hot water, to be connected on the secondary side of the heat exchanger which is fed with hot, gaseous heat extraction medium.

It has also been found to be particularly advantageous if the ducts for accommodating the heating elements are constructed as tubes of heat resistant material with high thermal conductivity which are inserted into the container, the interior of the said tubes being always accessible from the outside of the container. In a further advantageous embodiment at least the duct for accommodating the heating element but preferably also the guide duct for the heat extraction medium may be constructed of heat resistant material and may be welded or soldered to the wall of the container.

Preferably at least some of the tubes, which form the ducts for accommodating the heating elements, are disposed in thermally conductive contact with at least some of the tubes which form the guide ducts for the thermal extraction medium.

To this end it has been found particularly advantageous in storage heater units with ducts for accommodating heating elements and guide ducts for the thermal extraction medium in the form of metal tubes if, in a further suitable embodiment of this idea of the invention, the ducts for accommodating the heating elements and the guide ducts for the thermal extraction medium are welded or soldered to each other preferably by the interposition of an intermediate plate which increases the size of the thermal transfer surface. Particularly simple constructive embodiments can be achieved in this way by utilizing the other advantages of the invention.

One embodiment of the invention is explained hereinbelow by reference to the accompanying drawing in which it is shown purely diagrammatically and in which FIG. 1 is a vertical section through a storage heater arranged for direct space heating with warm or hot air and FIG. 2 is a horizontal section along the line II—II according to FIG. 1.

The embodiment illustrated in the drawing refers to a unit which can be used for space heating by directly heating the room air. The bottom of a container 5 of steel plate is provided with apertures into which vertically positioned tubes of suitable cross-section are inserted to function as guide ducts for a gaseous heat extraction medium and are welded to the bottom plate of the container 5. As may be seen by reference to the horizontal section of FIG. 2 the tubes are distributed throughout the container 5 so that a uniform heat distribution may be expected over the horizontal cross-section of the container 5. To this end the tubes 4, which are constructed of metal, preferably iron and function as guide duct for the gaseous heat extraction medium are already sufficiently located in their vertical extension, usually by welding to the bottom part of the container 5.

As may be seen more particularly by reference to FIG. 2 the ducts 1 or 2 respectively for heating elements 3 are disposed transversely to the guide ducts 4 for the thermal extraction medium which is symbolized by the arrows A, B and C. As may be seen by reference to the upper part of the vertical section according to FIG. 1 the ducts 1 or 2 respectively for the heating elements are also constructed as metal tubes and are disposed without physical contact and therefore without thermally conductive contact with the guide ducts 4 for the thermal extraction medium. This arrangement may be provided over the entire vertical section of the storage heater volume the construction of which will be described hereinbelow, more particularly if no value is placed on a particularly low thermal inertia in a storage heater according to the invention. In this case and as may be seen in FIG. 2, the tubes 1 or 2 respectively, which form the ducts for accommodating the heating elements 3, are inserted into corresponding recesses of the side walls of the container 5 and are secured thereat. To this end the horizontally disposed ducts for receiving the heating elements 3 may be welded to the wall of the container 5. In this way they simultaneously function as tie rods or compression bars which enable the container 5 to be constructed of relatively thin metal sheet thus leading to a substantial saving of prime costs.

By disposing the guide ducts for the gaseous heat extraction medium in vertical configuration it enables the heating elements to be horizontally disposed so that the electrical connection thereof may be made from one or both sides of the storage heater. The constructive simplifications which are achievable thereby as regards the electrical equipment and maintenance repair and exchange of heating elements are obvious. At the same time the supply of heat to the thermal storage medium is rendered substantially more uniform as regards local distribution.

FIG. 1 shows two different kinds of tubes to explain that those for accommodating the heating elements 3 may have a different cross-section, namely simple circular tubes 1 in the zone of the left half of the vertical section for accommodating one heating element 3 in the interior 8 of the said tube and so called flat tubes 2 on the right half of the vertical section for accommodating a plurality, for example three heating elements 3.

As may be seen by reference to the lower vertical section zone of FIG. 1, part of the tubes 1 or 2 respectively for receiving the heating elements are in thermal conductive contacts with the guide tubes 4 for the thermal extraction medium in order to increase the thermal transfer of the thermal energy supplied by the heating elements 3 which, as shown diagrammatically in FIG. 2 are connected by known conductors to the busbars 18 and 19 of an electrical network, the electrical connections being of no significance to the invention and being therefore not shown, the said supplied thermal energy being transferred by thermal radiation and/or thermal conduction to the tubes 1 or 2 respectively and from there by thermal conduction to the thermal storage medium 6, thus improving the inertia characteristics of the entire storage heater. To this end the corresponding tubes 1 or 2 respectively may be directly welded to the tubes 4 with which they intersect by bearing upon each other but it has been found that a substantial increase of thermal transfer from the tubes 1 or 2 respectively of the heating elements to the tubes 4 which carry the thermal extraction medium can be achieved by interposing intermediate plates 13 to which on the one hand the tubes 1 or 2 respectively and on the other hand the tubes 4 are welded or are soldered if a material other than iron is used.

This construction in which the tubes 1 or 2 respectively are welded or soldered to the tubes 4, which may also be provided over the entire cross-sectional height by contrast to the illustration of FIG. 1, also offers the mechanical advantage of stiffening the entire container 5 not only with respect to its oppositely disposed side walls but more particularly with regard to transversely disposed walls. The container wall 5 constructed in this manner and the intersectingly joined tubes secured thereon by means of welding or soldering form a load bearing, rigid and torsional resistance skeleton which enables the walls of the container and the tubes to be constructed of particularly thin material thus enabling substantial cost savings to be achieved quite apart from the substantial reduction of the large weight which is frequently detrimental, particularly in larger units.

The heat storage container 6 in the form of packed solids, is introduced into the remaining interior space of the container 5. The said packed solids which are preferably vibrated and/or tamped while being introduced may comprise a granule collection of small particles, not secured relative to each other and having a good thermal storage capacity and consisting of minerals containing heavy metals, more particularly packed bulk containing ground overburden rock from ore production, preferably hematite minerials, with the possible addition of iron granulate of the kind yielded as waste in foundries. The packed solids bulk 6 may however also comprise exclusively small cast iron beads in order to achieve a particularly high thermal storage co-efficient but it is preferably that the said beads are then surrounded by mineral dust or for example metallic electrostatic filtration dust and that the spaces between the beads are filled with this material. The maximum particle size of the thermal storage material 6 is 1.5 mm, at least 5 percent by weight comprising pulverized material with particle sizes of less than 0.2 mm in order to improve binding and filling intestices in the interests of increasing the thermal storage co-efficient. In this connection it should be mentioned that this is a surprising effect because the addition of dust material does not by any means enable the maximum bulk density to be obtained. However, experience has shown that the thermal storage capacity of the entire packed solids bulk which forms the thermal storage medium can be increased by the addition of such dust material against the opinion held by experts that the proportion of such dust material should not exceed 20 percent of the total weight of the bulk since substantial proportions of packed bulk material whose particle size exceeds approximately 0.2 mm has been shown by experience to lead to a reduction of the pack weight and therefore to a substantial impairment of the thermal storage capacity.

Experience has shown that a mineral granulate with the following composition is particularly advantageous as thermal storage medium: iron more than 45 percent by weight, manganese less than 0.08 percent by weight, phosphorus less than 0.3 percent by weight, calcium oxide less than 4.5 percent by weight, silicon dioxide more than 3.0 percent by weight and aluminum oxide more than 0.4 percent by weight.

The material which is preferred for the thermal storage medium has the following composition: 65.90 percent by weight of iron, 0.03 percent by weight of manganese, 0.018 percent by weight of phosphorus, 0.10 percent by weight of calcium oxide, mangesium oxide traces, 4.70 percent by weight of silicon oxide, 0.49 percent by weight of aluminum oxide, 0.01 percent by weight of chromium, 0.01 percent by weight of copper, 0.034 percent by weight of titanium dioxide, and 0.04 percent by weight of carbon. Material of this kind is commercially available with the finished desired particle composition as broken bulk material under the name of iron glance. However, other kinds of bulk material can be employed provided they have a specific heat of at least 0.12 kcal/° C kgf and, given a suitable bulk density, a product of specific heat and bulk density of at least 0.7 kcal/° C dm$^3$ or a product of specific heat and bulk density of at least a same value, given a bulk density of at least 2.5 kgf/dm$^2$ and a suitable specific heat. According to experience this is made possible by minerals containing heavy metals, iron-bearing minerals obtained in iron ore winning with or without the addition of pure iron granulate, for example cast iron beads of suitable particle size composition are preferred as the cost of such material is low.

It has also been found particularly advantageous to employ a granulate with a maximum particle size of approximately 1.5 mm, preferably covering the range between 0.3 mm to approximately 1.25 mm. It has also been found advantageous if the granulate contains at least 5 percent by weight of pulverized material with particle sizes of less than 0.2 mm. A proportion of the pulverized material equivalent to a maximum of 20 percent by weight of the granulate is to be preferred. A further improvement of the thermal storage capacity can be achieved in simple and economical manner if the solids bulk is vibrated and/or tamped while it is introduced into the container.

The upwardly orientated surface of the thermal storage material pack 6 is consolidated by thermally resistant adhesive joining in order to form a surface which is protected against the discharge of very fine dust particles from the thermal storage material 6. A mineral glue, preferably containing water glass is used for adhesive joining and may be prepared, for example on the basis of finely ground mineral dust of the thermal storage material 6. Between the thermally resistant adhesive joining 10 of the intrinsically consolidated surface of the thermal storage material 6, which could also have been replaced by a suitably constructed cover plate, and the internal wall of the covering part of the container 6 there is formed a wind chamber 9 which communicates with external atmosphere through one or two discharge apertures 21 for the thermal extraction medium. Apart from a mixing of the individual heated part streams of gaseous heat extraction medium discharged from the individual guide tubes 4 in the wind chamber 9 and therefore accompanied by a temperature compensation for any local temperature irregularities between the individual part flows there is also smoothing of the flow so that eddies or the like are substantially avoided when the flow exits from the wind chamber 9 into the external atmosphere which is to be directly heated.

Furthermore, the bottom wall of the container 5 contains a discharge aperture 11 for the pourable heat storage material 6, the said aperture being sealed in suitable manner by a lid 12. If the thermal storage material 6 or the tubes 1, 2 or 4 have to be changed in the event of repairs which may become necessary the thermal storage material 6 may be rapidly and conveniently removed through this aperture. The thermal storage medium may be subsequently introduced in the same simple and convenient manner the special inventive choice of the said pourable solids material also offering the advantage of particularly good filling of even the smallest cavities in the interior of the container 5, where such cavities can never be completely avoided for reasons of construction and without the need for making allowances of storage bricks being disposed in layers and while substantially avoiding any unnecessary joints between them.

In order to still further increase the thermal storage capacity of a storage heater according to the invention with given external dimensions a further and not yet anticipated idea of the invention is characterized in that the outside of the container for the thermal storage medium is provided with a thermal barrier 40 of lower thermal conductivity and/or higher thermal radiation capacity than that of the material of which the container is constructed. If an increase of the thermal storage capacity is not required the external dimensions of the storage heater according to the invention can be reduced by means of this inventive development while the thermal storage capacity remains the same. In each case the thermal losses to the ambient atmosphere are substantially reduced by the thermal barrier employed in accordance with the invention. According to the invention the thermal barrier may comprise aluminum oxide and/or zirconium oxide. It has been surprisingly found possible for the material, which forms the thermal barrier to be applied by coating or spraying to a thickness of up to approximately 1.0 mm on the outside of the container for the thermal storage medium and/or the wind chamber side surface of the wind chamber wall. As a result the storage capacity can be increased still further for given dimensions than would normally correspond to the saving of avoided heat losses because the use of the thermal barrier according to the invention enables the stratum thickness of the insulating material to be reduced for a given external temperature of the wall of the container for the thermal storage medium by using the thermal barrier according to the invention, this reduction permitting the volume of the thermal storage medium to be increased.

Like the external surface of the container 5 for the heat storage medium, which is also not shown in detail, the surface of the wall of the wind chamber 9 nearest to the interior thereof may be provided with a heat barrier 40, applied cold, comprising a covering which is applied on the insulating material stratum on the container wall and consists of a mineral glue, for example water glass or bonded aluminum oxide. Apart from a particularly low thermal conductivity this material has a surprisingly low thermal radiation absorption capacity so that by applying it relatively thinly it is possible to achieve a substantial reduction of the wall thickness of conventionally employed material for the thermal insulation of the container 5 for the thermal storage medium 6, given the same temperature of the external surface and identical temperature of the internal surface and therefore the same temperature drop or, given the same wall thickness of conventional insulating material under these conditions enables a lower temperature to be achieved on the external surface of the container insulation thus resulting in a substantial improvement of reliability and thermal economy.

The circulation of the thermal extraction medium is formed as follows:

Part of the ambient air is supplied via the suction socket 16 to a fan 14 which accelerates the said air and delivers it through the inlet duct 17 into an inlet chamber 15 which is disposed below the bottom wall of the container 5 for the thermal storage medium 6. The inlet chamber comprises an upright plate 22 which is secured on the bottom of the container 5 by means of angle irons which are not referenced but illustrated.

Any desired other known construction of an inlet chamber may also be employed to this end. The ambient air flows into the fan 14, which is preferably detachably secured on the container 5 for the thermal storage material 6, in the direction indicated by the arrow A and the air accelerated in the said fan flows into the inlet chamber 15 in the direction indicated by the arrow B. From the inlet chamber 15 the air flows through the interior spaces 7 of the air ducts 4 into the wind chamber 9 while abstracting heat from the surrounding heat storage materials 6 while flowing through the ducts 4. The air flow is smoothed as already described in the wind chamber 9 and this is accompanied by simultaneous temperature exchange and a discharge of warm or hot air through the exit duct 21 as indicated by the arrow C.

The numeral 20 of FIG. 2 shows a regulating and switching device of known construction for supplying electrical energy from the bus bars 18, 19 to the heating elements 3, the regulating and switching device 20 receiving the measured values and control pulses from measuring transducers disposed in suitable manner but not shown since they do not affect the invention.

It is clear that the invention may be employed for purposes other than direct space heating with air. For example a close circulation may be provided with suitable piping or the like between the arrows C and A, more particularly for industrial heating systems in which specific program controlled heating processes have to be provided, a heat exchanger for gaseous or liquid medium on the secondary side being connected in such piping to function as heat consumer. Instead of the air which is employed in the described embodiment it is also possible for a different gaseous heat extraction medium to be provided. Furthermore, a storage heater unit according to the invention which operates with air as heat extraction medium and has a forced circulation for air via a flow duct, not shown adapted to connect the hot exit 21 to the inlet socket of the fan 14 and which incorporates a heat exchanger for primary biasing with hot air and secondary conduction of water, may be used as heating energy transmitter for a warm water heating system of conventional kind when such a unit according to the invention may be employed in place of a flame fired boiler or in place of a storage heater unit with a water store of large volumetric capacity.

Although the invention is described merely by reference of one preferred application in purely exemplified form, it is not confined thereto. The expert has many and varied possibilities to adapt the invention to the conditions or requirements of each individual case by adopting a different combination of its features and/or exchanging them for identical means without departing from the scope of the invention.

I claim:

1. A storage heater for heating a gaseous heat extraction medium, the heater comprising: a container having walls formed of a heat resistant material; at least one guide duct, in the form of a tube extending through the container, for carrying gaseous heat extraction medium; a thermal storage medium within the container, means associated with the container for supplying heat to the storage medium, the medium comprising heavy metal-bearing minerals and being in the form of a pourable heavy metal-bearing minerals and being in the form of a pourable bulk of particulate solids and being suitable for directly contacting air to be heated for places of human habitation; the product of the specific heat of the solid and the bulk density of the pourable bulk being at least 0.7 kcal/° C dm$^3$, the specific heat of the solid being at least 0.12 kcal/° C kgf and the bulk density of the pourable bulk being at least 2.5 kgf/dm$^3$.

2. A storage heater as claimed in claim 1 wherein the heat storage medium comprises a bulk packing of a granulated mineral containing iron.

3. A storage heater as claimed in claim 1, wherein the thermal storage medium comprises ground overburden rock obtained from winning iron ore.

4. A storage heater as claimed in claim 3 wherein the thermal storage medium contains hematite minerals.

5. A storage heater as claimed in claim 4 wherein the thermal storage medium comprises a mineral granulate with the following composition:
    Iron more than 45 percent by weight, manganese less than 0.08 percent by weight, phosphorus less than 0.3 percent by weight, calcium oxide less than 4.5 percent by weight, silicon dioxide more than 3.0 percent by weight and aluminum oxide more than 0.4 percent by weight.

6. A storage heater as claimed in claim 4 wherein the thermal storage medium comprises a mineral granulate of the following composition:
    65.90 percent by weight of iron, 0.03 percent by weight of manganese, 0.018 percent by weight of phosphorus, 0.10 percent by weight of calcium oxide, magnesium oxide traces, 4.70 percent by weight of silicon dioxide, 0.49 percent by weight of aluminum oxide, 0.01 percent by weight of chromium, 0.01 percent by weight of copper, 0.034 percent by weight of titanium dioxide and 0.06 percent by weight of carbon.

7. A storage heater as claimed in claim 4, wherein the thermal storage medium is a granulate having a maximum particle size of approximately 1.5 mm.

8. A storage heater as claimed in claim 7 wherein the particle size is between approximately 0.3 to approximately 1.25 mm.

9. A storage heater as claimed in claim 7 wherein the granulate contains at least 5 percent by weight of pulverized material with particle sizes of less than 0.2 mm.

10. A storage heater as claimed in claim 9 wherein the granulate contains a maximum of 20 percent by weight of such sized pulverized material.

11. A storage heater as claimed in claim 1 wherein a surface of the thermal storage medium is exposed to air, the exposed surface of the thermal storage medium being intrinsically consolidated by heat resistant adhesive joining.

12. A storage heater as claimed in claim 11 wherein a mineral glue is used for adhesive joining.

13. A storage heater as claimed in claim 12 wherein the mineral glue contains water glass.

14. A storage heater as in claim 12 wherein the mineral glue contains a slurry of pulverized thermal storage medium.

15. A storage heater as in claim 12 wherein the mineral glue is applied to a thickness of approximately 1 mm on the surface of the thermal storage material.

16. A storage heater as in claim 11, comprising a plurality of guide ducts for the gaseous medium passing vertically through the storage medium and a plenum wind chamber within the heater, located above the storage medium and in fluid flow connection with all of the guide ducts, wherein one boundary surface by the wind chamber is formed of the adhesively joined surface of the thermal storage medium and which forms the top surface of the medium.

17. A storage heater as in claim 1 wherein the container for the thermal storage medium is provided on its exterior with a thermal barrier of lower thermal conductivity and higher thermal radiation capacity than the material of the container.

18. A storage heater as claimed in claim 17 wherein the thermal barrier contains aluminum oxide.

19. A storage heater as in claim 17, wherein the material which forms the thermal barrier is a coating having a thickness of up to approximately 1.0 mm on the outside of the container for the thermal storage medium.

20. A storage heater as in claim 1, wherein said means for supplying heat to the thermal storage medium includes a heating element duct disposed approximately horizontally through the container and said at least one guide duct for the gaseous thermal extraction medium being disposed approximately vertically through the container, the heating element duct and the guide duct both being surrounded around their circumference and along the length extending within the container by the thermal storage medium.

21. A storage heater as in claim 20, wherein one of said ducts is constructed as a compression bar, or tie-rod, adapted to connect two oppositely disposed walls of the container.

22. A storage heater as claimed in claim 20 wherein the duct for accommodating the heater element is constructed as a tube of heat resistant material of high thermal conductivity which is inserted into the container and whose interior is accessible from the outside of the said container.

23. A storage heater as in claim 20 wherein the container is constructed of metal.

24. A storage heater as in claim 23, wherein the container and the ducts are constructed of metal and the ducts are connected to the wall of the container by means selected from the group consisting of welding and soldering.

25. A storage heater as in claim 20, wherein the heating element duct is disposed in thermally conductive contact to at least a portion of the guide duct.

26. A storage heater as in claim 25, wherein the guide duct and the heating element duct are each connected to an intermediate plate which enlarges the thermal transfer surface area between them.

27. A storage heater as in claim 1 wherein the container comprises a wind chamber in communication with one end of said at least one guide duct, said wind chamber being provided on its interior surface with a thermal barrier of lower thermal conductivity and higher thermal radiation capacity than the material of the container.

* * * * *